US006278599B1

(12) United States Patent
Gasque, Jr.

(10) Patent No.: US 6,278,599 B1
(45) **Date of Patent: *Aug. 21, 2001**

(54) LIGHTNING RETARDANT CABLE AND CONDUIT SYSTEMS

(75) Inventor: Samuel N. Gasque, Jr., Hendersonville, NC (US)

(73) Assignee: MAG Holdings, INC, Hendersonville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/361,061

(22) Filed: Jul. 26, 1999

Related U.S. Application Data

(63) Continuation-in-part of application No. 09/066,237, filed on Apr. 24, 1998, now Pat. No. 5,930,100, which is a continuation-in-part of application No. 08/741,536, filed on Oct. 31, 1996, now Pat. No. 5,744,755.

(51) Int. Cl.[7] .................................. H02H 1/04; H02H 3/22
(52) U.S. Cl. ............................ 361/117; 361/110; 174/108
(58) Field of Search .................................... 361/91.1, 110, 361/111, 113, 107, 108, 117, 118, 119; 174/36, 35 R, 35 CE, 37, 38, 68.1, 68.3, 95, 78, 106 R, 105 R, 107, 109; 333/12, 236, 243; 385/100, 107, 113

(56) References Cited

U.S. PATENT DOCUMENTS

| | | | |
|---|---|---|---|
| 3,297,814 | 1/1967 | McClean et al. | 174/106 R X |
| 3,351,706 | 11/1967 | Gnerre et al. | 174/108 X |
| 3,484,679 | 12/1969 | Hodgson et al. | 333/243 X |
| 4,119,793 | 10/1978 | Rabinowitz | 174/36 |
| 4,268,714 | 5/1981 | Mori | 174/108 |
| 4,301,428 | 11/1981 | Mayer | 333/243 X |
| 4,687,882 | 8/1987 | Stone et al. | 174/102 SC |
| 4,719,319 | 1/1988 | Tighe, Jr. | 174/106 R X |
| 4,738,734 | 4/1988 | Ziemek | 174/108 X |
| 4,816,614 | 3/1989 | Baigrie et al. | 333/243 X |
| 5,061,823 | 10/1991 | Carroll | 174/108 X |
| 5,218,167 | 6/1993 | Gasque, Jr. | 174/37 |
| 5,235,299 | 8/1993 | Vaille et al. | 333/243 |
| 5,325,457 | 6/1994 | Bottoms, Jr. et al. | 385/113 |
| 5,744,755 | 4/1998 | Gasque | 174/108 |

FOREIGN PATENT DOCUMENTS

| | | | |
|---|---|---|---|
| 0 071 435 | 9/1983 | (EP) | H01B/7/26 |

OTHER PUBLICATIONS

*The Lightning Book*, by Peter E. Viemeister, Apr. 1972, p. 201.

*Primary Examiner*—Ronald W. Leja
(74) *Attorney, Agent, or Firm*—Carter & Schnedler, P.A.

(57) ABSTRACT

There is provided a cable which retards lightning. The cable includes at least one internal conductor which may be a power conductor or a signal conductor. A choke conductor is wound about the internal conductor in the shape of a spiral. If lightning strikes near the cable or a device which is attached to the cable, such as an antenna, the choke conductor presents a high impedance to the current caused by lightning and will prevent the lightning current from flowing down the choke conductor, thus entering the internal conductor, thereby preventing damage to the internal conductor and any associated electronic equipment. Preferably, a shield is also wound about the internal conductor adjacent to the choke conductor in a direction opposite to the choke conductor, whereby the angle formed by the crossing of the choke conductor and the shield is approximately 90° to block the magnetic field component of the lightning discharge. The choke conductor and the shield may be wound about a conduit which houses the cable.

28 Claims, 7 Drawing Sheets

LIGHTNING RETARDANT CABLE AND CONDUIT SYSTEMS

RELATED APPLICATION

This is a continuation-in-part of U.S. application Ser. No. 09/066,237, filed on Apr. 24, 1998, now U.S. Pat. No. 5,930,100 which is a continuation-in-part of U.S. patent application Ser. No. 08/741,536, filed Oct. 31, 1996, which issued as U.S. Pat. No. 5,744,755 on Apr. 28, 1998.

BACKGROUND OF THE INVENTION

This invention relates to electrical cable. More particularly, it relates to electrical cable which retards lightning so that the cable is not substantially affected by the lightning and, in the case of communication cable, the communication signal on a signal conductor within the cable is not substantially affected, as well as its associated equipment.

While this invention is applicable to both power and communication cable, most of the detailed discussion herein will focus on communication cable used in conjunction with an antenna.

As used herein, the term antenna includes television and radio antenna, satellite dishes and other devices which receive electromagnetic signals. A major problem associated with an antenna is caused by lightning striking the antenna. Often the high current associated with the lightning will travel through the communication cable which is attached between the antenna and electronic equipment. This current will damage the electronic equipment.

According to *The Lightning Book*, by Peter E. Viemeister, self-induction in a conductor may occur during a lightning strike. This occurs because lightning currents may rise at a rate of about 15,000 amperes in a millionth of a second. For a straight conductor with the usual cross section, this surging current can produce nearly 6,000 volts per foot of wire, which is enough to jump an insulated gap to a nearby conductor, such as the center conductor, in a coaxial cable.

Currently lightning protection of cable is more focused on the installation of cable within a system. The National Electric Code attempts to insure a proper path for lightning to discharge, thus reducing the damage of equipment connected to the end of the cable. The cable in and of itself offers little or no protection from electric fields or magnetic fields associated with the lightning strike. Even though electrical codes provide suggestions on installing and grounding equipment, their primary focus is providing a straight path to ground for lightning to discharge and eliminating the differences of potential between the two items.

FIG. 1 is an example of a home TV antenna installation according to the National Electric Code. If lightning were to strike antenna 10, half of the charge would be on ground wire 12 which is attached to the mast 14 of the antenna, and the other half would be on the coaxial cable's outer shield 16 which is connected to the antenna terminals 18. Theoretically, the current on coaxial cable 16 would travel to antenna discharging unit 20 and then through grounding conductor 22. The center conductor or signal conductor of the coaxial cable, however, is unprotected, which means that damage to the electronics in the receiver and other components within the home is likely. Furthermore, the longer the lead-in wire, the greater the problem. As lightning strikes this antenna 10 and discharges to ground, a large electric field is set up along the coaxial lead-in wire 16 and ground wire 12. At right angles to this electric field is an exceptionally strong magnetic field which surrounds all of the cable.

In addition, lightning follows the straightest, closest and best path to ground. Any sharp bends, twists or turns of the ground wire sets up resistance to the quick discharge. See Page 201 of *The Lightning Book*, referred to above. This resistance usually causes the discharge to jump off the ground wire with the bend and into a path of least resistance.

OBJECTS OF THE INVENTION

It is one object of this invention to provide an improved lightning retardant cable which may or may not be received in a conduit.

It is another object to provide a lightning retardant cable which deals with both electric and magnetic fields caused by lightning.

SUMMARY OF THE INVENTION

In accordance with one form of this invention there is provided a lightning retardant cable which includes at least one internal conductor. The internal conductor may be a signal conductor or a power conductor. A signal conductor conducts a signal containing information. A power conductor conducts current for operating devices and equipment.

A choke conductor is provided. The choke conductor is wound about the internal conductor in the shape of a spiral. The choke conductor is not in contact with the internal conductor. The choke conductor presents a high impedance to the electrical current caused by lightning when the lightning strikes near the cable.

Preferably, the internal conductor is made of metal for conducting electrical signals or current, although the internal conductor may be an optical fiber.

It is also preferred that a spiraled shield be placed underneath the choke conductor. The spiraled shield is also wound about the internal conductor, but in an opposite direction to the choke conductor. The adjacent windings of the shield are not in electrical contact with one another and act as another choke. Preferably, 90° angles are formed at the crossing points between the choke conductor and the shield.

The choke conductor dissipates the electric field caused by the lightning strike. The shield performs two functions. It acts as a choke in the opposite direction of the choke conductor and thus enhancing the cancellation process and it acts as a Faraday Cage to greatly reduce the associated magnetic field.

It is also preferred that one side of the shield be insulated so that when the shield is wound about the cable a winding is not in electrical contact with the previous or next winding. The insulation over the shield may extend over one of the edges of the shield to reduce the likelihood of arcing.

The choke conductor may also be insulated. The choke conductor may be substantially rectangular in shape with, preferably, round edges. In addition, each end of the insulated choke conductor may be electrically connected to a corresponding end of the shield. This connection may be made by winding an insulated part of the choke conductor about an uninsulated part of the shield at each end of the cable.

It is also preferred that an overall outer jacket be provided for the cable and that a ground conductor be attached to the outer jacket.

Also, the choke conductor and shield may be wound about the cable as described above, or they may be wound about a conduit which receives the cable. It is preferred that the induction of the choke and the shield be substantially equal. The number of turns in which the choke is wound may be adjusted to equalize their inductance.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 3:
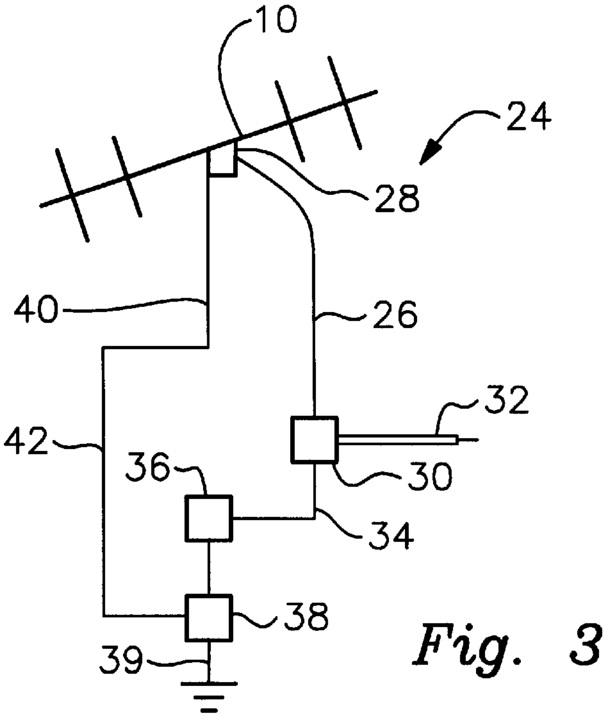
FIG. 3 is also a simplified electrical diagram showing the antenna signal transmission and grounding system of the subject invention.

Referring now more particularly to FIG. 3 which relates to an embodiment of the invention where the lightning retardant cable is a communication cable, there is provided antenna signal transmission and grounding system 24 for grounding antenna 10. As previously indicated, antenna 10 may also be a satellite dish or another device for receiving signals from the air. System 24 includes lightning retardant cable 26, which is the cable of the subject invention and will be described in more detail below. Lightning retardant cable 26 is attached to antenna 10 at connector lead box 28. Cable 26 is also connected to standard antenna discharge unit 30. A typical antenna discharge unit 30 is a Tru Spec commercially available from C Z Labs. A coaxial cable 32 is connected to the discharge unit 30 and to electronic equipment (not shown).

A ground wire 34 connects the antenna discharge unit 30 to ground clamps 36 and 38. Ground clamp 38 is, in turn, connected to ground rod 39. In addition, the antenna mast 40 is connected to ground clamp 38 through ground wire 42.

Figure 1:
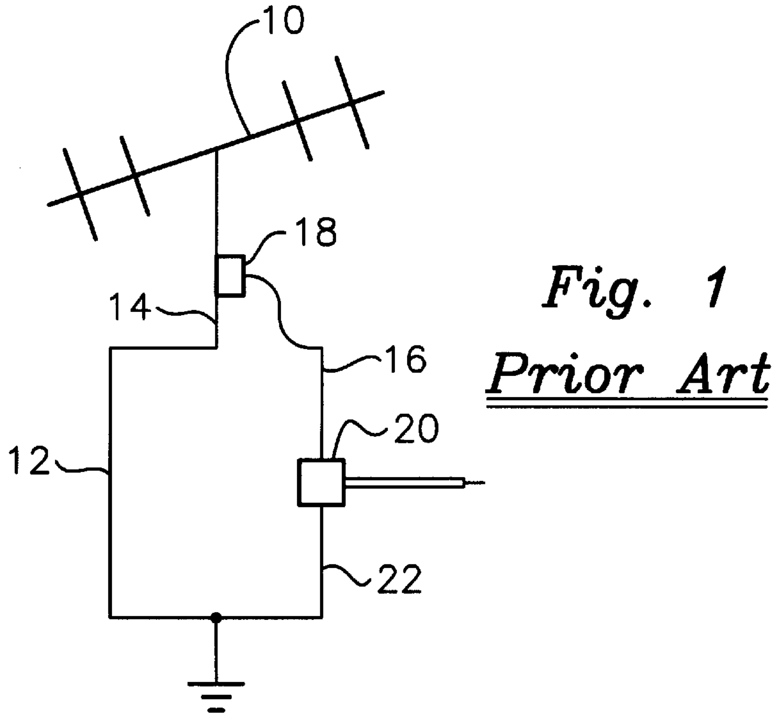
Fig. 1 Prior Art
FIG. 1 is a simplified electrical diagram showing a prior art antenna signal transmission and grounding system.
Figure 2:
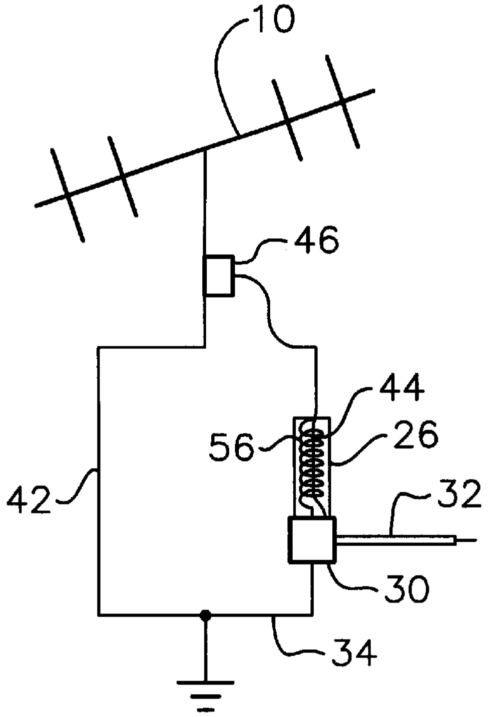
FIG. 2 is a simplified electrical diagram showing the antenna signal transmission and grounding system of the subject invention.

FIG. 2 is similar to FIG. 3, but illustrates some of the details of cable 26. In the communication cable embodiment of this invention, cable 26 is preferably a coaxial cable, although, cable 26 could be a fiber optic cable or twin lead cable. A communication cable must include at least one signal conductor. In the preferred communication cable embodiment of this invention, however, cable 26 is a coaxial cable. FIG. 2 illustrates the center conductor 44. Center conductor 44 is the signal conductor and is connected to terminal box 46 attached to the mast of the antenna 10. Signal conductor 44 is connected through antenna discharge unit 30 to coaxial cable 32. Spiraled choke conductor 56 surrounds signal conductor 44 and is connected to antenna discharge unit 30 which, in turn, is connected to ground conductor 34. Cable 26 will be discussed in more detail below.

Figure 4:
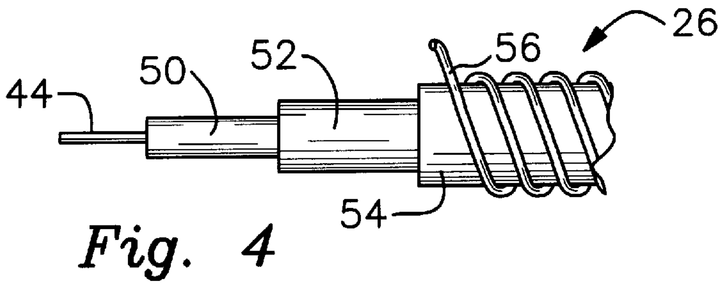
FIG. 4 is a side elevational view of the lightning retardant cable of the subject invention.

FIG. 4 shows lightning retardant cable 26 having signal center conductor 44 which is surrounded by foam dielectric 50. A standard coaxial cable shield 52 surrounds the dielectric 50. Insulated jacket 54 surrounds shield 52. A choke conductor 56 is wound about outer jacket 54 in a spiraled fashion. An overall outer insulated jacket may be placed over the cable to provide protection for the cable. The choke conductor 56 should be large enough to handle the high currents caused by lightning without melting. Choke conductor 56 should be at least 17 gauge and preferably is 10 gauge. Preferably the choke conductor is made of copper. If the choke conductor is made of a bundle of round copper wires, the bundle should be equivalent to at least 17 gauge wire or larger.

Referring now to FIG. 2, if lightning strikes antenna 10, the energy of that strike would normally be split, that is, one-half would follow ground wire 42 and the other half would follow cable 26 to ground rod 39. However, since cable 26 forms an electrical choke due to spiraled choke conductor 56, that is, conductor 56 actually chokes out the flow of current due to its high impedance to lightning current which has a very fast rise time, the majority of the surge follows ground wire 42 to ground and does not follow cable 26 to ground. One-half of the energy from the strike that would start down cable 26 after a lightning strike would quickly be cancelled out by the action of the choke. Each time the choke conductor 56 is twisted around the cable, it causes the electric field generated by the lightning to interact upon itself, thus blocking the flow of current.

Figure 5:
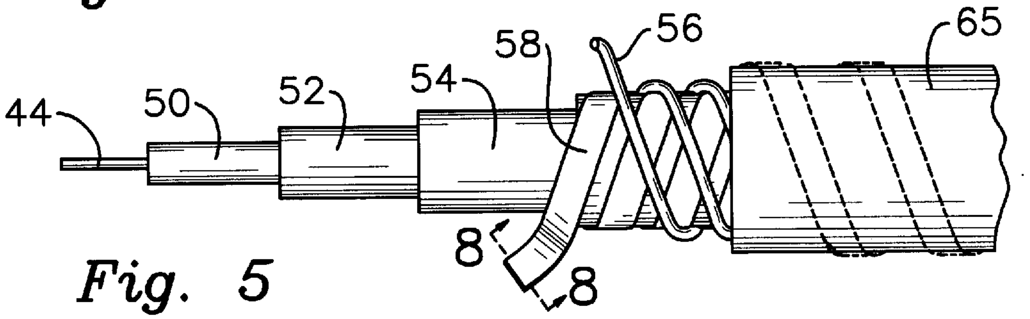
FIG. 5 is a side elevational view of an alternative embodiment of the lightning retardant cable of the subject invention.

As with any electrical discharge, there is an electric field, as well as a magnetic field at right angles to the electric field. Lightning causes a tremendously large magnetic field due to the huge discharge of electric current. FIG. 5 shows an alternative embodiment of the lightning retardant cable of the subject invention which includes a special shield to block the magnetic component of the lightning discharge, thus acting as a Faraday Cage.

In FIG. 5 there is provided a center signal conductor 44, dielectric 50, standard coaxial cable shield 52 and coaxial cable jacket 54. A substantially flat spiraled wrapped shield 58 is wound over the top of coaxial cable jacket 54.

Figure 8:
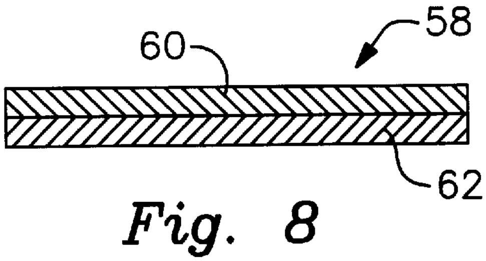
FIG. 8 is a cross sectional view of the spiraled shield of FIGS. 5, 6 and 7.

As shown by a cross section of the spiraled shield 58 in FIG. 8, the shield includes a conductive top metal portion 60 which is insulated by plastic insulation 62 on the bottom. Thus the shield may be spiraled upon itself without causing an electrical short. Metal portion 60 of shield 58 is preferably made of aluminum or copper. Shield 58 is commercially available.

Choke conductor 56 is spiraled over the top of shield 58 in the opposite direction to the spiral of shield 58. Preferably, both shield 58 and choke conductor 56 are spiraled at 45° angles with respect to signal conductor 44. Thus the shield and the choke conductor cross at 90° angles. Alternatively, the spirals for both the choke conductor and the shield could be adjusted to various angles to maximize inductance depending on the desired effect.

Figure 6:
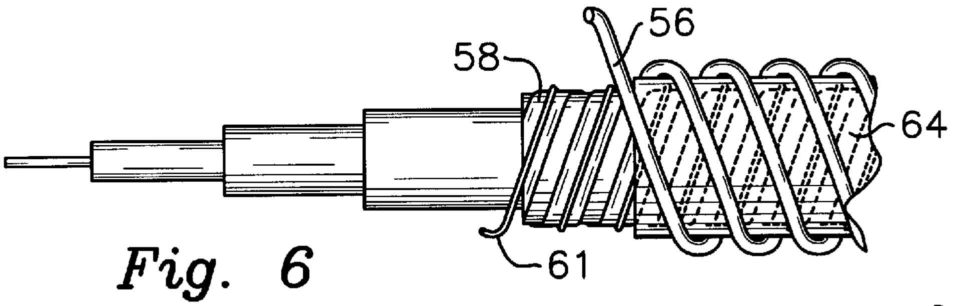
FIG. 6 is a side elevation view of another alternative embodiment of the lightning retardant cable of the subject invention.

In the embodiment of FIG. 5, choke conductor 56 is in electrical contact with the metallic portion 60 of shield 58. However, in the embodiment of FIG. 6, an insulated jacket 64 is provided between spiraled shield 58 and choke conductor 56 and a small drain wire 61 is placed in contact with shield 58 between shield 58 and jacket 64. The drain wire 61 enables one to conveniently terminate the shield. In the design shown in FIGS. 5 through 8, both electric and magnetic fields are addressed. The electric field is addressed by the spiraled choke conductor 56 which, as indicated above, functions as an electrical choke. The magnetic field is addressed by the spiraled shield 58, which acts as a Faraday cage. Also, the spiraled shield acts as a flat choke in the opposite direction of the spiraled electrical choke 56, thus enhancing the cancellation effect. Therefore, shield 58 has two functions.

As indicated above, preferably, the shield 58 is preferably at a 45° angle with respect to center transmission signal conductor 44 and is spiraled in counterclockwise wrap. The choke conductor 56 is preferably also at a 45° angle with respect to center conductor 44, but is spiraled in the opposite direction around the shield 58, i.e., clockwise. The directions in which the choke conductor and signal conductor are wound could be reversed. The result is a 90° angle between the magnetic shield and the electric choke. The choke conductor 56 could be in the form of a second shield.

Figure 7:
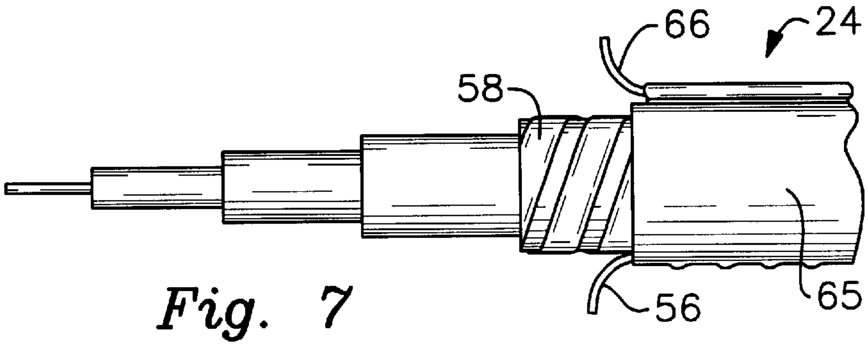
FIG. 7 is a side elevational view of yet another alternative embodiment of the lightning retardant cable of the subject invention.

Referring now more particularly to FIG. 7, for ease of installation, a ground wire 66 may be made as a component of the cable 26. Ground wire 66 is attached to the outer jacket 65 of the cable and is embedded in plastic which forms part of the extruded jacket 65. The ground wire 66 runs the length of the cable. The ground wire is set apart from the main cable so that it may easily be detached and attached to a grounding rod.

The cable shown in FIG. 5 has been tested in the laboratory and in the field. The results show a substantial improvement over the prior art.

Figure 9:
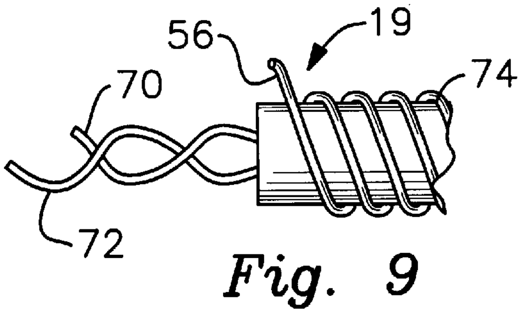
FIG. 9 is a side elevational view of another alternative embodiment of the lightning retardant cable of the subject invention for a power application.

The detailed description above primarily discusses communication cable applications of the invention. FIG. 9 shows a lightning retardant cable 69 of the subject invention for power applications. Internal conductor 70 and 72 are power conducts which are normally heavier gauge than communication conductions. Often a gravel conductor (not shown) is placed adjacent to the power conductors. Conductors 70 and 72 are covered by insulated jacket 74. Choke conductor 56 is spiraled about jacket 74 in the same fashion as shown and described in reference to FIG. 4. In addition, the shield arrangement shown in FIGS. 5, 6 and 7 may also be used in power cable applications.

Figure 10:
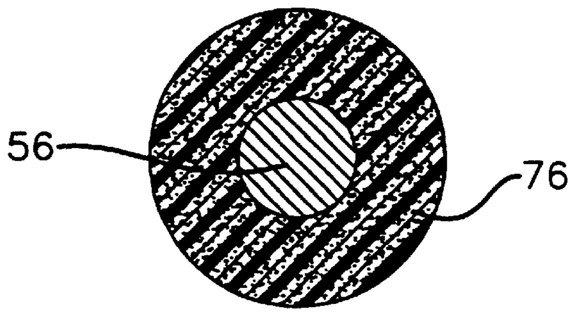
FIG. 10 shows a cross section of an insulated choke conductor which may be used with another embodiment of the invention.

The choke conductor 56 can be insulated with insulation so that it is not in electrical contact with shield 58. This insulation will electrically isolate the choke conductor 56 from shield 58 so that one may separate the electrical and magnetic fields. This will allow one to adjust the two windings, i.e., the shield and the choke, separately for maximum inductance. FIG. 10 shows a cross view of an insulated choke conductor. Item 56 is the choke conductor and item 76 is an insulative jacket.

It may become necessary, depending upon the application, that the choke conductor's insulative jacket 76 be slightly conductive. A compound, such as carbon, can be added to the insulation to increase this conductivity, i.e., to make the insulation semi-conductive.

Figure 11:
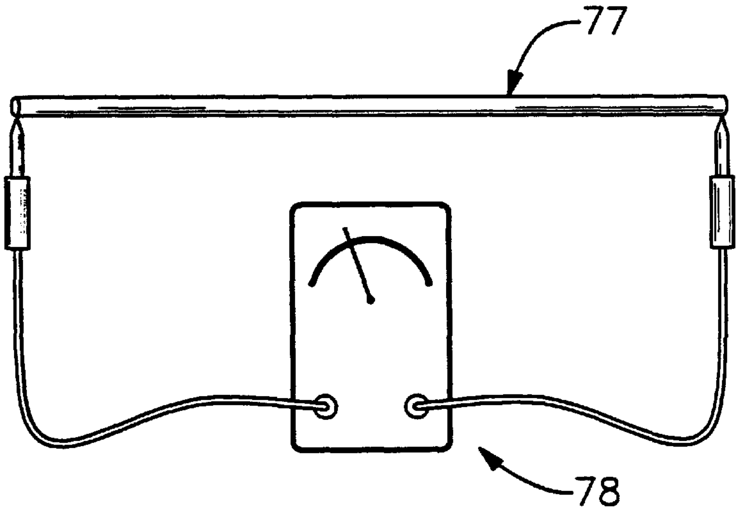
FIG. 11 shows an inductive meter measuring the inductance of a straight wire.
Figure 12:
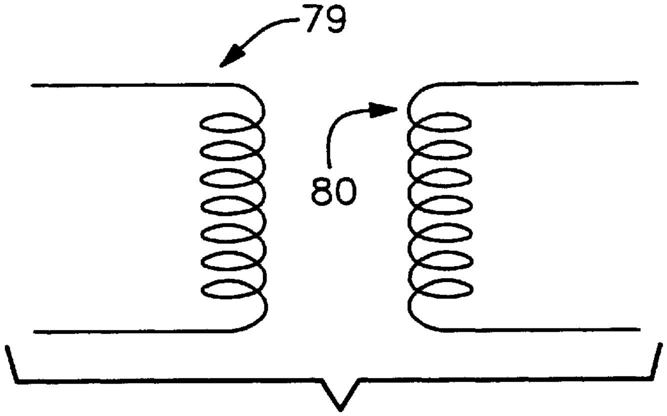
FIG. 12 shows a pair of oppositely wound inductors.
Figure 12A:
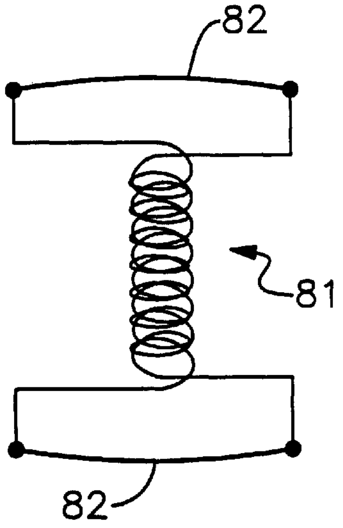
FIG. 12A shows the inductors of FIG. 12 being closely spaced and connected together at their opposing ends.
Figure 12B:
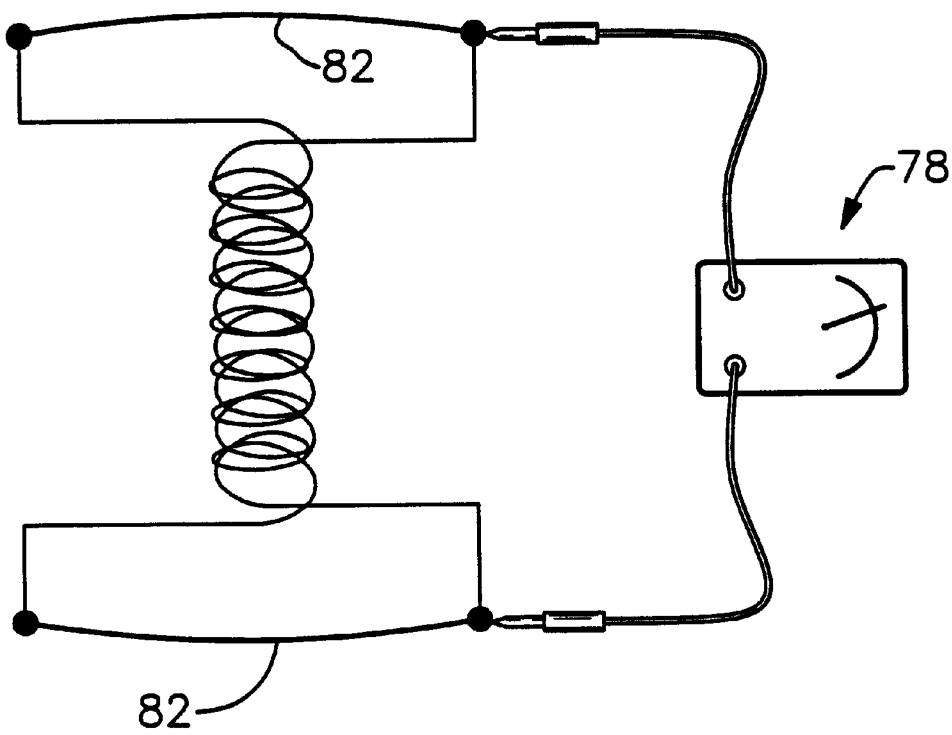
FIG. 12B shows the inductors of FIG. 12A having an inductive meter connected there across.

Lightning will usually follow the path of least resistance or least inductance to ground. Every straight wire has an inductance. To minimize the inductance, you can actually use two coils wound opposite of each other. The fields of these two coils will cancel out each other and result in "0" induction. In FIG. 11, item 78 illustrates an inductive meter measuring the inductance of a straight wire 77. In FIG. 12, items 79 and 80 illustrate inductors. If the second inductor 80 is wound opposite inductor 79, as shown by 81 in FIG. 12A, and the two are electrically connected at both ends 82, then the inductance should read "0", as illustrated by meter 78 in FIG. 12B.

Figure 13:
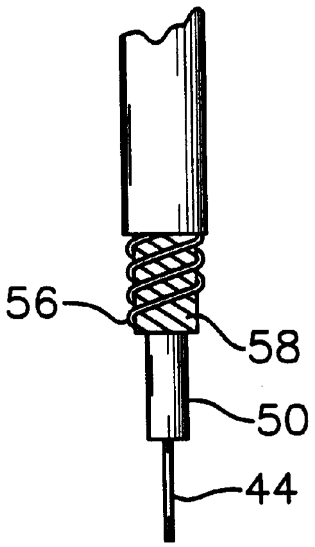
FIG. 13 shows the cable which utilizes the choke conductor construction of FIG. 10, wherein only one end of the choke conductor is connected to one end of the shield.

Certain applications of lightning retardant cable may be enhanced if only one end of the cable has the choke 56 connected or grounded to shield 58. This allows the shield to function as a Faraday cage shielding the inner coax or wires from the magnetic fields of any induced energy. FIG. 13 illustrates this construction. In this illustration, choke 56 and shield 58 are in electrical contact at one end of the cable only. This can be accomplished by winding the choke 56 around shield 58 so that they are in mechanical and electrical contact, as illustrated in FIG. 14.

Figure 14:
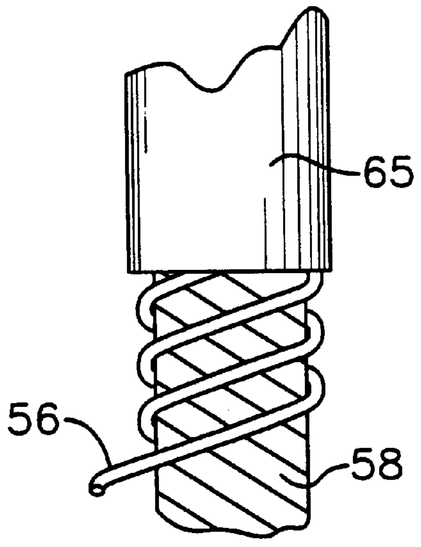
FIG. 14 is a more detailed view of the cable of FIG. 13.

FIG. 14 shows a cross view of cable 65. Item 58 is the spiral shield wrapped so that there is 100% full overlapping coverage. Choke 56 is stripped of insulation and wrapped around shield 58 so that it is in mechanical and electrical contact.

Figure 15:
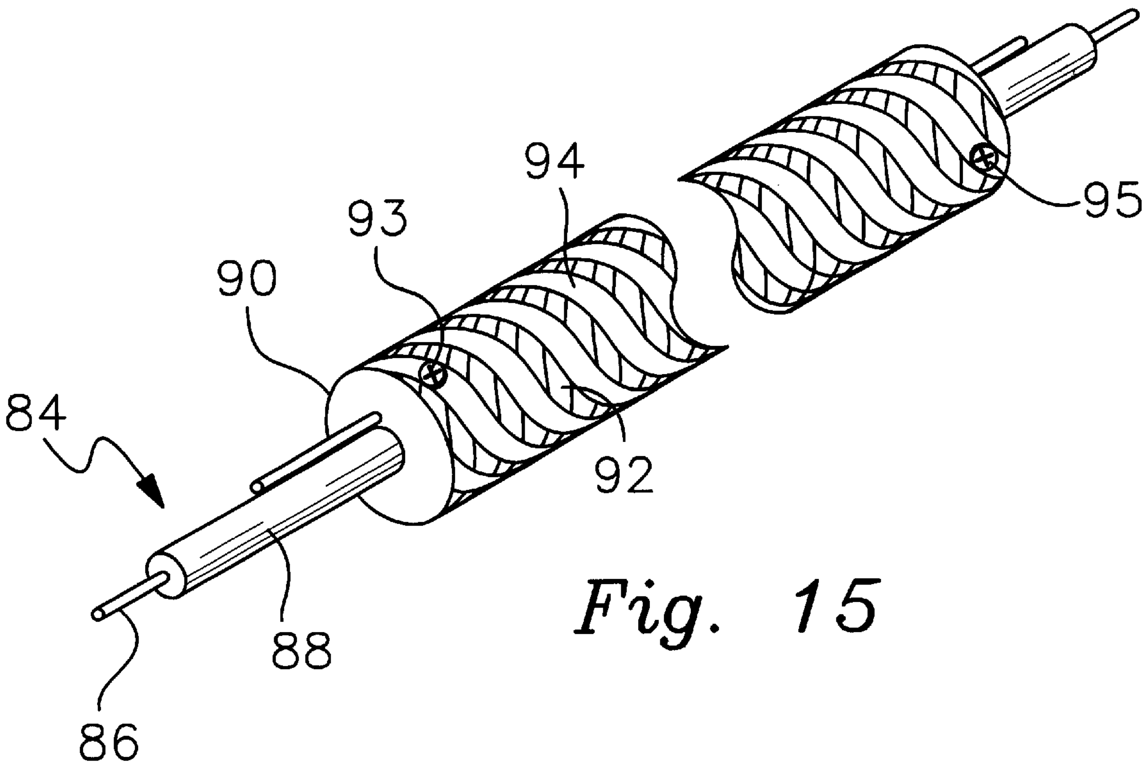
FIG. 15 is a perspective view showing a cable received within a conduit with the choke and shield conductors being spiraled about the conduit.

Referring now more particularly to FIG. 15, there is provided insulated cable 84 including conductor 86 and an insulation layer 88. Cable 84 is received within conduit 90 which may be a typical plastic extruded conduit. Insulated shield 92 is wound about the outside of conduit 90 and the uninsulated side of shield 92 makes contact with the outer surface of plastic conduit 90. Choke conductor 94 is wound about conduit 90 in the opposite direction to shield 92. Preferably, the choke conductor and shield 92 cross one another in an angle of 90°. The choke conductor may or may not be insulated. If the choke conductor is uninsulated, it should make contact with the insulated side of shield 92 for the entire length of the cable, except at the far ends. The far end of the choke conductor is electrically connected to the shield conductor by a connection device, such as bolt 93, at one end and by a connection device, such as bolt 95, at the other end.

Figure 16:
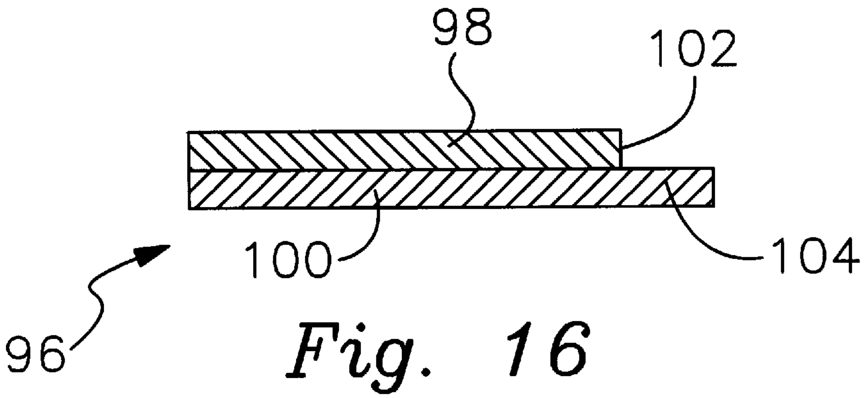
FIG. 16 is a sectional view showing an insulated shield with the insulation extending past one of the edges of the shield.
Figure 17:
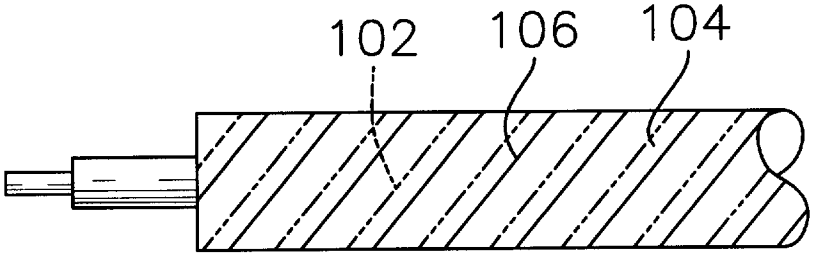
FIG. 17 is a side elevational view of the shield of FIG. 16 applied to a cable with one of the side edges of the shield shown in phantom.

Referring now more particularly to FIG. 16, a specially designed insulated shield may be used to reduce arcing problems, namely, insulated shield 96. Insulated shield 96 includes flat conductor 98 which is insulated by insulation 100. Insulation 100 extends beyond edge 102 of the shield so as to form an expanded section 104 of the insulation. This enables overlap 106 between adjacent turns of the shield, as indicated in FIG. 17, so as to reduce the probability of arcing between adjacent turns of the shield. This expanded insulation could be placed on top of the shield, depending on how it is wrapped. In addition, the insulation material 100 may not be attached at all to the metal portion of the shield 96, but it may be a separate piece of insulation applied to the cable during the manufacturing process between the windings of the shield.

Figure 18:
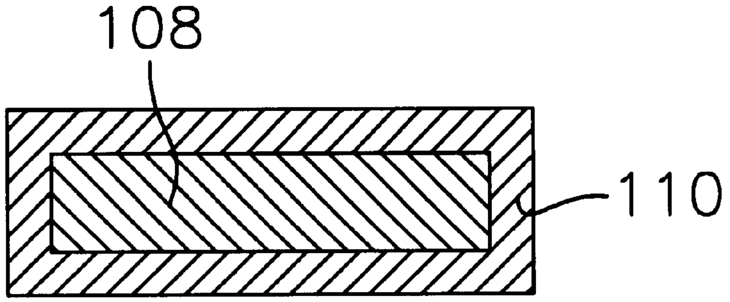
FIG. 18 is a sectional view showing a substantially rectangular shaped choke conductor which is insulated.
Figure 19:
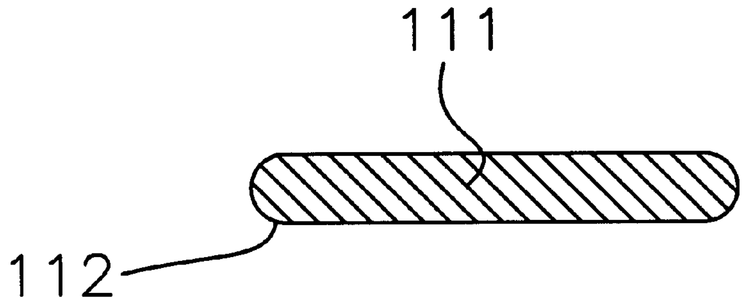
FIG. 19 is a section view showing an uninsulated substantially rectangular choke conductor with round edges.
Figure 20:
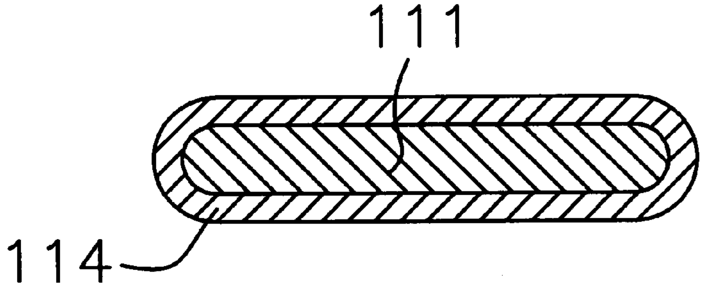
FIG. 20 is a section view showing the choke conductor of FIG. 19 being insulated.
Figure 21:
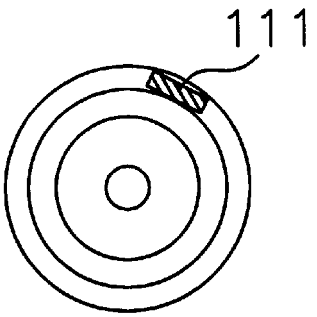
FIG. 21 is a sectional view of a cable showing the choke conductor of FIG. 19 forming a part thereof.
Figure 22:
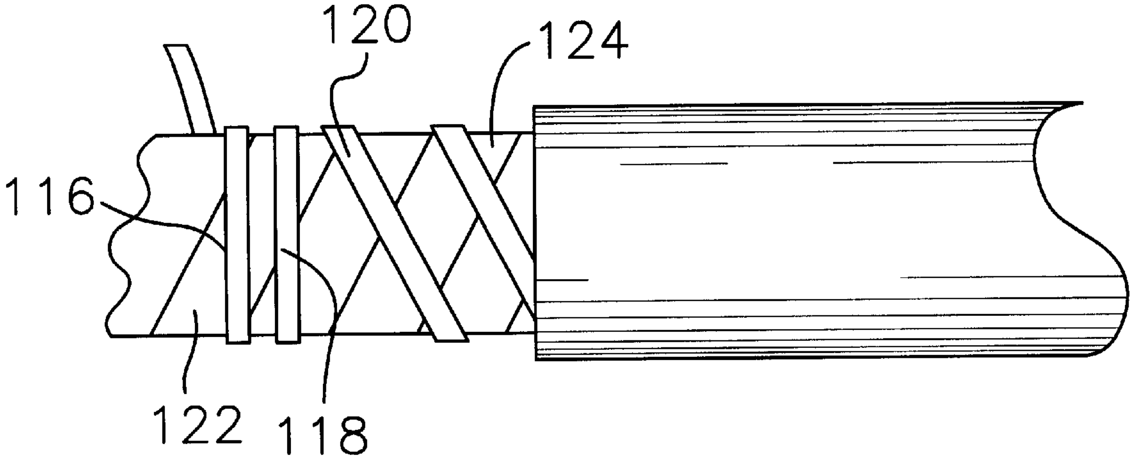
FIG. 22 is a side elevation view of a cable having portions of the jacket removed for clarity showing one end of a choke conductor terminated to one end of a shield conductor.

In many situations, the choke conductor is simply a #10 or #12 round wire. The size of the wire was chosen since it meets usual National Electric Code requirements for grounding and has been shown to be large enough to handle direct lightning hits without burning through. A large wire wrapped around a cable alters the normally smooth round appearance, resulting in a so-called spiral hump on the cable due to the outer choke conductor's size. In practices, spiral hump could be a problem if the cable is pulled through a conduit with other cables since it would tend to cause binding on the spiral hump as it slides over the cables or joints in the conduit. This can be solved or improved upon by using a different shape of choke conductor wire, such as a so-called flat wire which, in reality, is substantially in a rectangular shape, as illustrated in FIGS. 18–21. FIG. 18 shows substantially rectangular shaped choke conductor 108 which has been insulated by insulation 110. However, because a rectangular shaped conductor includes sharp edges 112, it is preferred that edges 112 be rounded, as shown in FIG. 19. FIG. 20 shows the substantially rectangular shaped rounded edge conductor being insulated by insulation 114. As shown in FIG. 21, the substantially rectangular shaped conductor 111 or an insulated flat conductor, shown in FIG. 18, will not cause this spiraled hump, but will present a smooth surface outer jacket cable.

The lightning retardant cable discussed above preferably includes two chokes, one in the form of a so-called choke conductor, and the other in the form of a spiraled shield magnetically opposite, but having substantially identical inductances. The shield and the choke conductor are normally terminated at each end, as referred to above. Various techniques may be used to terminate the shield to the choke conductor. One technique is illustrated in FIG. 21 which shows the uninsulated portions 116 and 118 of choke 120 being placed in contact with uninsulated portion 122 of shield 124. The insulation of the shield is stripped and if the choke conductor is insulated, its insulation is also stripped, so as to make electrical contact with one another.

When energize the two opposing coils' magnetic fields cancel because they are oppositely wound, therefore the current does not flow down the coils outside the cable. When manufacturing the cable, the shield is normally wound first. The flat shield is usually, but not always, one inch in width. The electrical induction of the flat choke can be measured with an induction meter or an impedance bridge. The choke conductor or drain wire, which is usually a round configuration, but, as stated above, could be a substantially rectangular configuration, is a solid wire due to its physical characteristics. If it is wrapped at a 45° angle opposite to the shield, its electrical characteristics, i.e., its inductance will be slightly different. In order for the lightning retardant cable to achieve maximum performance, the two coiled inductors should have substantially the same inductance, as measured by an impedance bridge. This can be accomplished by adjusting the number of turns of the drain wire if the shield turns are fixed. Once the choke conductor is applied, it can be tuned to the shield's inductance by wrapping extra turns at one end of the cable or both ends until the inductance is the same.

From the foregoing description of the preferred embodiments of the invention, it will be apparent that many modifications may be made therein. It will be understood, however, that the embodiments of the invention are exemplifications of the invention only and that the invention is not limited thereto. It is to be understood therefore that it is intended in the appended claims to cover all modifications as fall within the true spirit and scope of the invention.

What is claimed is:

1. A cable and conduit system comprising:

a cable having at least one internal conductor;

a conduit; said conduit having an outer surface and an inner cavity; said cable received within said inner cavity of said conduit;

a choke conductor; said choke conductor wound about said outer surface of said conduit in the shape of a spiral;

a spiraled shield; said spiraled shield being wound about said outer surface of said conduit in a direction which is opposite to the direction in which said choke conductor is wound; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a high voltage discharge near said cable; said magnetic fields being substantially cancelled, thereby reducing the damaging effects of the high voltage discharge.

2. A cable as set forth in claim 1, wherein said choke conductor is substantially rectangular shaped.

3. A cable as set forth in claim 2, wherein said choke conductor includes four edges; each of said edges being rounded.

4. A cable as set forth in claim 2, wherein said choke conductor is insulated.

5. A cable as set forth in claim 3, wherein said choke conductor is insulated.

6. A cable as set forth in claim 1, wherein said internal conductor is insulated.

7. A cable as set forth in claim 1, wherein said choke conductor is at least 17 gauge.

8. A cable as set forth in claim 7, wherein said internal conductor is a signal conductor; a coaxial cable shield surrounding said signal conductor, whereby said cable is a coaxial cable.

9. A cable as set forth in claim 1, wherein said choke conductor is spiraled at an angle of approximately 45° with respect to said internal conductor.

10. A cable as set forth in claim 1, wherein said spiraled shield is in the form of a flat conductor; at least one side of said flat conductor having electrical insulation attached thereto.

11. A cable as set forth in claim 1, further including an insulation layer located between said choke conductor and said spiraled shield.

12. A cable as set forth in claim 1, further including a layer of insulation surrounding said choke conductor.

13. A cable as set forth in claim 12, wherein said layer of insulation surrounding said choke conductor includes an amount of conductive material, whereby said insulation layer is semi-conductive.

14. A cable as set forth in claim 1, wherein said spiraled shield and said choke conductor cross one another at an angle of approximately 90°.

15. A cable as set forth in claim 1, wherein said choke conductor is in the form of a second shield.

16. A cable as set forth in claim 1, further including a ground conductor attached to said cable.

17. A cable as set forth in claim 1, wherein the spiral angles of said choke conductor and said shield may be adjusted to maximize inductance.

18. An antenna signal transmission and grounding system comprising:

a cable; said cable including at least one signal conductor; said signal conductor for conducting a signal containing information;

a conduit; said conduit receiving said cable;

a choke conductor; said choke conductor wound about said conduit in the shape of a spiral; said choke conductor presenting a high impedance to electrical current caused by lightning when lightning strikes near said cable;

a spiraled shield; said spiraled shield being wound about said conduit in a direction opposite to the direction in which said choke conductor is wound; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a high voltage discharge near said cable; said magnetic fields being substantially cancelled, thereby reducing the damaging effects of the high voltage discharge.

19. A system as set forth in claim 18, further including a layer of insulation surrounding said choke conductor.

20. A system as set forth in claim 19, wherein said layer of insulation surrounding said choke conductor includes an amount of conductive material, whereby said insulation layer is semi-conductive.

21. A system as set forth in claim 18, wherein said spiraled shield and said choke conductor cross one another at an angle of approximately 90°.

22. An antenna signal transmission and grounding system comprising:

a cable; said cable including at least one signal conductor; said signal conductor for conducting a signal containing information;

a conduit, said cable received within said conduit;

a choke conductor; said choke conductor wound about said conduit in the shape of a spiral;

a spiraled shield adjacent to said choke conductor; said spiraled shield being wound about said conduit; said spiraled shield and said choke conductor being wound in opposites directions; each end of said choke conductor connected to an adjacent end of said spiraled shield.

23. A lightning retardant cable comprising:

a cable having at least one internal conductor;

a choke conductor; said choke conductor wound about said internal conductor in the shape of a spiral;

a spiraled shield; said spiraled shield being wound about said internal conductor in a direction which is opposite to the direction in which said choke conductor is wound; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a high voltage discharge near said cable; said magnetic fields being substantially cancelled, thereby reducing the damaging effects of the high voltage discharge;

said choke conductor being substantially rectangular shaped.

24. A cable as set forth in claim 23, wherein said choke conductor includes four edges; each of said edges being rounded.

25. A cable as set forth in claim 23, wherein said choke conductor is insulated.

26. A cable as set forth in claim 23, wherein said choke conductor is in the form of a second shield.

27. A lightning retardant cable comprising:

a cable having at least one internal conductor;

a choke conductor; said choke conductor wound about said internal conductor in the shape of a spiral;

a spiraled shield; said spiraled shield being wound about said internal conductor in a direction which is opposite to the direction in which said choke conductor is wound; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a high voltage discharge near said cable; said magnetic fields being substantially cancelled, thereby reducing the damaging effects of the high voltage discharge;

said first end of said choke conductor being wrapped about said cable, wherein an uninsulated part of said choke conductor is in contact with an uninsulated part of said shield; said second end of said choke conductor being wrapped about said cable, wherein an uninsulated part of said choke conductor is in contact with an uninsulated part of said shield.

28. A lightning retardant cable comprising:

a cable having at least one internal conductor;

a choke conductor; said choke conductor wound about said internal conductor in the shape of a spiral;

a spiraled shield; said spiraled shield being wound about said internal conductor in a direction which is opposite to the direction in which said choke conductor is wound; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a high voltage discharge near said cable; said magnetic fields being substantially cancelled, thereby reducing the damaging effects of the high voltage discharge;

said choke conductor having an appropriate number of turns so that the inductance of said choke conductor and said shield are substantially equal.

* * * * *